June 30, 1959 E. LEROY 2,892,634
FRONT END SUSPENSION SYSTEM FOR VEHICLES
Original Filed June 28, 1955 3 Sheets-Sheet 1

INVENTOR.
Etienne Leroy
BY Michael S. Striker
Attorney

June 30, 1959 E. LEROY 2,892,634
FRONT END SUSPENSION SYSTEM FOR VEHICLES
Original Filed June 28, 1955 3 Sheets-Sheet 3

INVENTOR.
Etienne Leroy
BY
Michael S. Striker
Attorney

United States Patent Office 2,892,634
Patented June 30, 1959

2,892,634

FRONT END SUSPENSION SYSTEM FOR VEHICLES

Etienne Leroy, Reims, France, assignor to Edmond Langeais, New York, N.Y.

Original application June 28, 1955, Serial No. 518,629, now Patent No. 2,857,010, dated October 21, 1958. Divided and this application January 16, 1957, Serial No. 634,460

3 Claims. (Cl. 280—96.2)

The present invention relates to a front end suspension system for vehicles, and more particularly to a rubber suspension system for the frame of a motor car.

The present application is a divisional application of my copending application Serial No. 518,629, filed June 28, 1955 now Patent No. 2,857,010.

It is one object of the present invention to provide in a vehicle a resilient front end suspension system which obtains a particularly smooth ride.

It is another object of the present invention to provide a front end suspension system for the frame of a vehicle for suspending the frame on the wheels on rubber links.

It is yet an object of the present invention to provide a suspension system for motor cars in which the frame of the vehicle is located below the wheel axes and is suspended by tensioned rubber links.

It is also an object of the present invention to provide a front end suspension for the frame of a vehicle in which the frame front portion is suspended by rubber links from the front wheel axles.

With these objects in view, the present invention mainly consists in a front end suspension in which a frame front end portion is suspended by rubber links on pivoted arms.

The front end suspension according to the present invention is particularly advantageously applied to small sports cars. The front end suspension according to the present invention causes the motor car to hug the road and to steer extremely well in curves even at high speeds without any sway.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
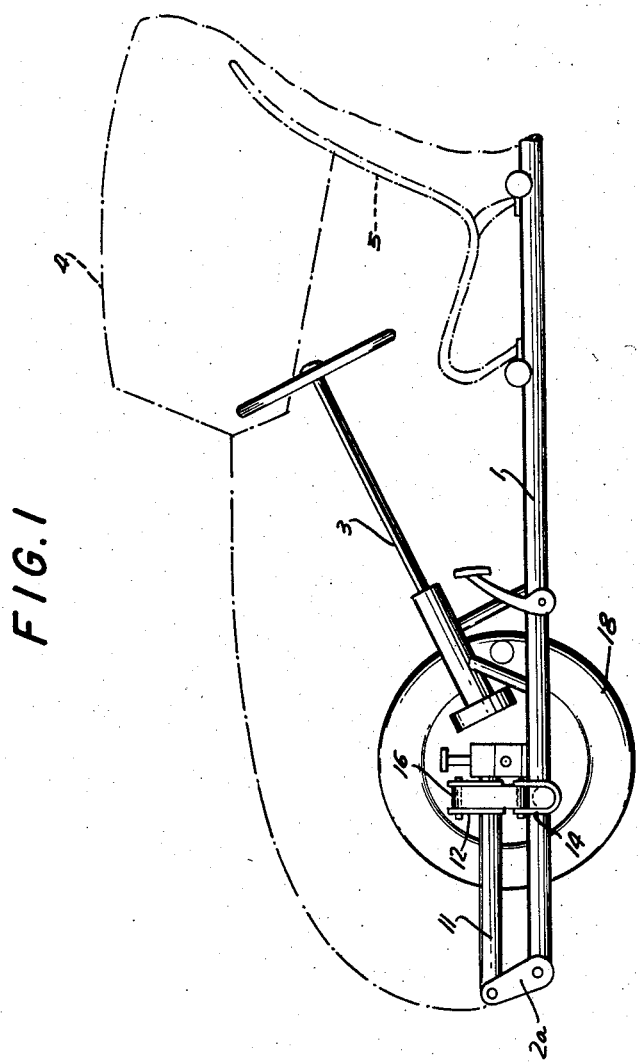
Fig. 1 is a side view of a front end suspension system according to the present invention.
Figure 3:
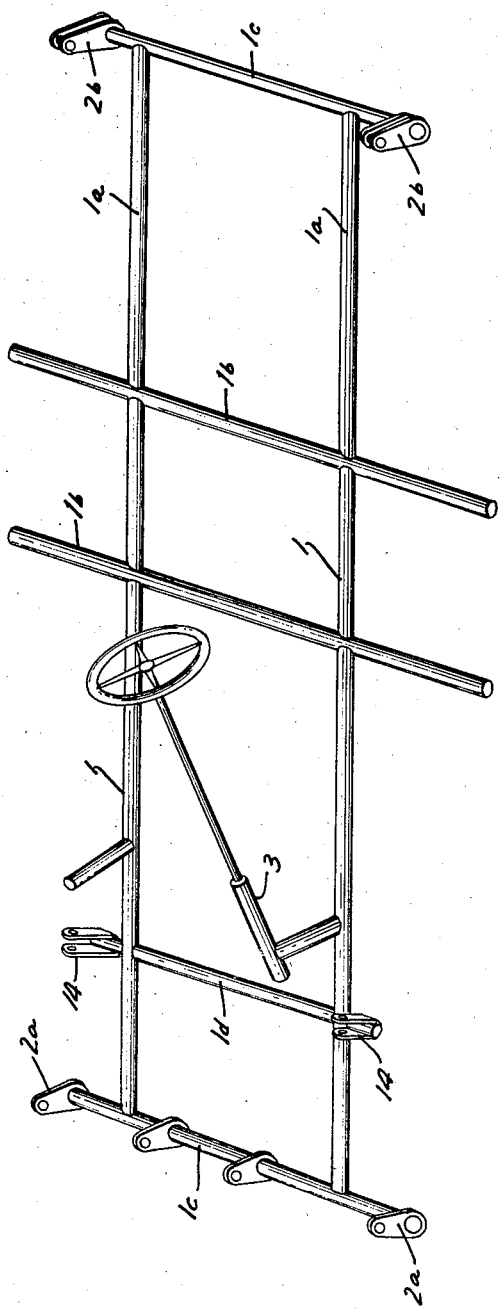
Fig. 3 is an isometric view illustrating a frame used in the arrangement of the present invention.

Referring now to the drawings, a frame 1, best seen in Fig. 3, comprises a pair of longitudinal members 1a, a pair of transverse members 1b, a pair of transverse end members 1c, and a transverse member 1d. Brackets 2a and 2b are secured to the end members 1c. The support for the steering wheel 3 is secured to one of the longitudinal members 1a, and the body of the vehicle 4, shown in broken lines in Fig. 1, is secured by suitable means to the transverse members 1b. Seats 5, shown in broken lines in Fig. 1, are also supported on the frame 1.

Figure 2:
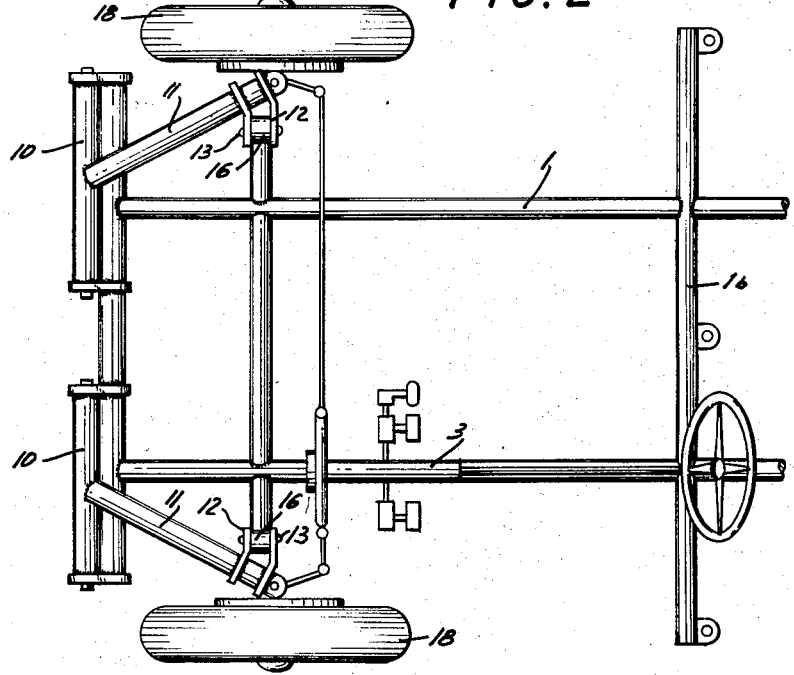
Fig. 2 is a plan view of a front end suspension system according to the present invention.

Referring now to Figs. 1 and 2, the front end suspension arrangement according to the present invention is constructed in the following manner. A pair of tubular members 10 are pivotally connected to the brackets 2a of the frame 1. Two arms 11 are fixedly secured at the front ends thereof to the tubular members 10 which constitute pivot means for the arms 11. The rear ends of the arms 11 carry brackets 12 provided with pins 13. Brackets 14 are secured to the transverse frame member 1d and are provided with pins 15. Rubber sleeves or loops 16 pass about the pins 13 and 15. Rear ends of arms 11 are rigidly secured to a sleeve 17a which is connected by a pin 17b to a sleeve 17 turnable relative to pin 17b. Sleeves 17 on both sides of the frame rigidly support the axles 17c of front wheels 18. Steering linkage means 19 are connected to the axle supporting sleeves 17 for turning the front wheels 18 in a known manner.

Figure 4:
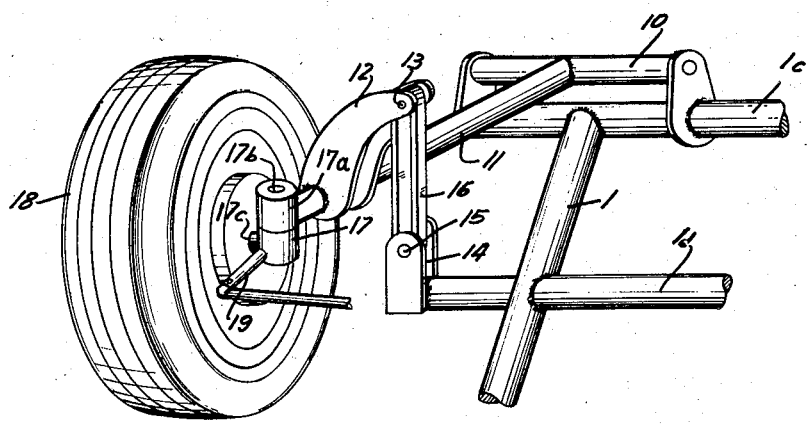
Fig. 4 is an isometric view illustrating a detail of a front end suspension according to the present invention.

As best seen in Figs. 2 and 4, the arms 11 extend from the pivot means 10, rearwardly and outwardly with respect to the frame 1.

From the above description of the front end suspension according to the present invention, it will be understood that the frame 1 is suspended from the wheel axles by the resilient rubber means 16. The front wheels 18 are free to swing independently of each other in accordance with the road conditions. When one of the front wheels 18 moves upwardly, the resilient rubber link 16 is tensioned so that the shock transfer to the frame 1 is lessened. When one of the front wheels moves downwardly into a hole in the road, the arms 11 can swing downwardly and even into a position in which the rear ends of the arms are located below the horizontal plane of the frame, since the arms 11 are located outwardly of the frame 1.

It will be understood that each of the elements described above, or two or more together, may also find a useful application in other types of front end suspension systems differing from the types described above.

While the invention has been illustrated and described as embodied in a front end frame suspension for a motor car including pivoted arms resiliently connected by rubber links to the frame of the vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A front end suspension for a vehicle comprising, in combination, a horizontal frame front end portion having a front end; a pair of pivot means mounted on said front end of said frame front end portion; a pair of arm means having front ends respectively mounted on said pivot means for pivotal movement about a transverse horizontal axis, each arm means having a rear end located rearwardly of said front end thereof, each of said rear ends being located outwardly of the associated pivot means and above said frame front end portion and said arm means being located outwardly of the respectively adjacent parts of said frame front end portion so that said arm means extend rearwardly and outwardly in opposite lateral directions with respect to said frame front end portion whereby said arm means and said frame front end portion can pivot relative to each other into a position in which said rear ends of said arm means are substantially located in the same horizontal plane as said frame front end portion; a pair of front wheel axle means, each front wheel axle means being secured to the rear end of one of said arm means; a pair of first brackets, each first bracket being secured to one of said arm means adjacent the rear end of the same; a pair of second brackets secured to said frame end portion at points rearwardly spaced from said pair of pivot means, respectively; a plurality of pins, each pin secured to one of said brackets; and a pair of loops consisting of a flexible resilient material, each of said loops passing about a pin on one of said first brackets and a pin on one of said second brackets so that said frame front end portion is resiliently suspended on said front wheel axle means and so that the arm means are free to swing downwardly from the upwardly extending normal position thereof.

2. A front end suspension for a vehicle comprising, in combination, a horizontal frame front end portion having a front end; a pair of pivot means mounted on said front end of said frame front end portion; a pair of arm means having front ends respectively mounted on said pivot means for pivotal movement about a transverse horizontal axis, each arm means having a rear end located rearwardly of said front end thereof, each of said rear ends being located outwardly of the associated pivot means and above said frame front end portion so that said arm means extend rearwardly and outwardly in opposite lateral directions with respect to said frame front end portion; a pair of front wheel axle means, each front wheel axle means being secured to the rear end of one of said arm means; a pair of first brackets, each first bracket being secured to one of said arm means adjacent the rear end of the same, each of said first brackets projecting inwardly and upwardly from the respective associated arm means and having a free end upwardly and inwardly spaced from the respective rear end of the respective arm means; a pair of second brackets secured to said frame end portion at points rearwardly spaced from said pair of pivot means and located below and opposite said free ends of said first brackets, respectively; a first pair of pins mounted, respectively, in said free ends of said first brackets; a second pair of pins mounted, respectively, in said second brackets; and a pair of loops consisting of a resilient material, each of said loops passing about a pin on one of said first brackets and a pin on one of said second brackets so that said frame front end portion is resiliently suspended on said front wheel axle means.

3. A front end suspension for a vehicle comprising, in combination, a horizontal frame front end portion having a front end; a pair of pivot means mounted on said front end of said frame front end portion; a pair of arm means having front ends respectively mounted on said pivot means for pivotal movement about a transverse horizontal axis, each arm means having a rear end located rearwardly of said front end thereof, each of said rear ends being located outwardly of the associated pivot means and above said frame front end portion so that said arm means extend rearwardly and outwardly in opposite lateral directions with respect to said frame front end portion; a pair of front wheel axle means, each front wheel axle means being secured to the rear end of one of said arm means; a pair of first brackets, each first bracket being secured to one of said arm means adjacent the rear end of the same, each of said first brackets projecting inwardly and upwardly from the respective associated arm means and having a free end upwardly and inwardly spaced from the respective rear end of the respective arm means; a pair of second brackets secured to said frame end portion at points rearwardly spaced from said pair of pivot means and located below and opposite said free ends of said first brackets, respectively; a first pair of pins mounted, respectively, in said free ends of said first brackets; a second pair of pins mounted, respectively, in said second brackets; and a pair of loops consisting of rubber, each of said loops passing about a pin on one of said first brackets and a pin on one of said second brackets so that said frame front end portion is resiliently suspended on said front wheel axle means.

References Cited in the file of this patent

UNITED STATES PATENTS

| | | |
|---|---|---|
| 1,987,791 | Opolo | Jan. 15, 1935 |
| 2,075,746 | Neiman | Mar. 30, 1937 |
| 2,604,317 | Koller | July 22, 1952 |
| 2,737,398 | Mohr | Mar. 6, 1956 |

FOREIGN PATENTS

| | | |
|---|---|---|
| 834,306 | France | Aug. 16, 1938 |